US010197813B2

(12) United States Patent
Lee et al.

(10) Patent No.: US 10,197,813 B2
(45) Date of Patent: Feb. 5, 2019

(54) LENS MOVING APPARATUS

(71) Applicant: LG INNOTEK CO., LTD., Seoul (KR)

(72) Inventors: Sung Guk Lee, Seoul (KR); Sang Jun Min, Seoul (KR); Tae Jin Jung, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/878,328

(22) Filed: Oct. 8, 2015

(65) Prior Publication Data
US 2016/0103331 A1    Apr. 14, 2016

(30) Foreign Application Priority Data

Oct. 8, 2014 (KR) .......................... 10-2014-0135562

(51) Int. Cl.
*G02B 27/64* (2006.01)
*G02B 7/09* (2006.01)
*G02B 7/08* (2006.01)

(52) U.S. Cl.
CPC ............. *G02B 27/646* (2013.01); *G02B 7/08* (2013.01)

(58) Field of Classification Search
CPC ...... G02B 27/46; G02B 27/64; G02B 27/646; G02B 7/08; G02B 7/02; G02B 7/102; G02B 7/04; H04N 5/225; H04N 5/232; H04N 5/23248; H04N 5/2257; H04N 5/2328; G11B 7/0932; G11B 7/0935; G03B 2217/005; G03B 5/00

USPC ....... 359/557, 554, 813, 814, 819, 824, 823; 396/55, 52, 53, 54

See application file for complete search history.

(56) References Cited

U.S. PATENT DOCUMENTS

| 4,568,142 A * | 2/1986 | Iguma ................ G11B 7/093 359/210.1 |
| 2011/0235196 A1* | 9/2011 | Ke ....................... G02B 7/023 359/824 |
| 2012/0229901 A1* | 9/2012 | Moriya ................ G03B 3/10 359/557 |
| 2013/0016428 A1* | 1/2013 | Sugawara ............ G02B 7/08 359/557 |

* cited by examiner

*Primary Examiner* — Jie Lei
(74) *Attorney, Agent, or Firm* — Saliwanchik, Lloyd & Eisenschenk

(57) ABSTRACT

A lens moving apparatus includes a housing for supporting a first magnet, a bobbin, which includes a first coil provided on an outer surface thereof and which moves in a first direction, a support member, which is disposed over one side surface of the housing, and which supports the bobbin and the housing such that the bobbin and the housing are movable in second and/or third directions, which are perpendicular to the first direction, a second coil, which is disposed over the housing, and which is spaced apart from the support member by a predetermined distance and which generates an electromagnetic force to move the support member in the second and/or third directions, and a printed circuit board disposed over the second coil.

16 Claims, 12 Drawing Sheets

LENS MOVING APPARATUS

CROSS REFERENCE TO RELATED APPLICATION

This application claims priority under 35 U.S.C. § 119 to Korean Patent Application No. 10-2014-0135562, filed on Oct. 8, 2014, which is hereby incorporated by reference in its entirety.

TECHNICAL FIELD

Embodiments relate to a lens moving apparatus, and more particularly, to a lens moving apparatus having an improved optical image stabilizing effect.

BACKGROUND

Recently, information technology products such as cellular phones, smart phones, tablet PCs and notebook PCs, in which ultracompact digital cameras are incorporated, are being actively developed.

A camera module mounted in a small-sized electronic product, such as a smart phone, may be frequently subjected to shocks during use. In addition, the camera module may minutely shake due to the trembling of the user's hand while taking a photograph. Therefore, there is a high necessity for a technology capable of incorporating an optical image stabilizer into the camera module.

In order to further improve such an optical image stabilizer, there is a necessity for structural improvement of a lens moving apparatus by the adjustment of focal length in the optical axis or the provision of an optical image stabilizing function.

BRIEF SUMMARY

Embodiments provide a lens moving apparatus having an improved optical image stabilizing effect.

In one embodiment, a lens moving apparatus includes a housing for supporting a first magnet, a bobbin, which includes a first coil provided on the outer surface thereof and which moves in a first direction, a support member, which is disposed over one side surface of the housing, and which supports the bobbin and the housing such that the bobbin and the housing are movable in second and/or third directions, which are perpendicular to the first direction, a second coil, which is disposed over the housing, and which is spaced apart from the support member by a predetermined distance and which generates an electromagnetic force to move the support member in the second and/or third directions, and a printed circuit board disposed over the second coil.

In another embodiment, a lens moving apparatus includes a housing for supporting a first magnet, a support member, which is disposed on one side surface of the housing, and which supports the housing such that the housing is movable in second and/or third directions, which are perpendicular to a first direction, a second coil, which is disposed over the housing and which generates an electromagnetic force to move the support member in the second and/or third directions, a printed circuit board disposed over the second coil, an upper elastic member disposed between the second coil and the housing, and a lower elastic member disposed under the housing.

BRIEF DESCRIPTION OF THE DRAWINGS

Arrangements and embodiments may be described in detail with reference to the following drawings, in which like reference numerals refer to like elements and wherein.

DETAILED DESCRIPTION

Figure 1:
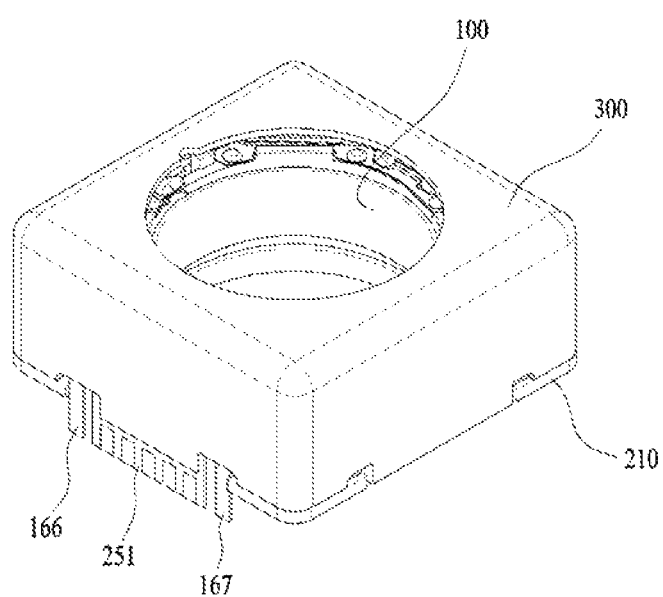
FIG. 1 is a schematic perspective view showing a lens moving apparatus according to an embodiment.

Hereinafter, embodiments will be described with reference to the attached drawings. In the drawings, the same or similar elements are denoted by the same reference numerals even when they are depicted in different drawings. In the following description, a detailed description of known functions and configurations incorporated herein will be omitted when it may make the subject matter of the disclosure rather unclear. Those skilled in the art will appreciate that some features in the drawings are exaggerated, reduced, or simplified for ease in description, and drawings and elements thereof are not shown always at the actual rate.

For reference, in the respective drawings, a rectangular coordinate system (x, y, z) may be used. In the drawings, the x-axis and the y-axis indicate a plane perpendicular to the optical axis, and for convenience, the optical axis (z-axis) direction may be referred to as a first direction, the x-axis direction may be referred to as a second direction, and the y-axis direction may be referred to as a third direction.

Figure 2:
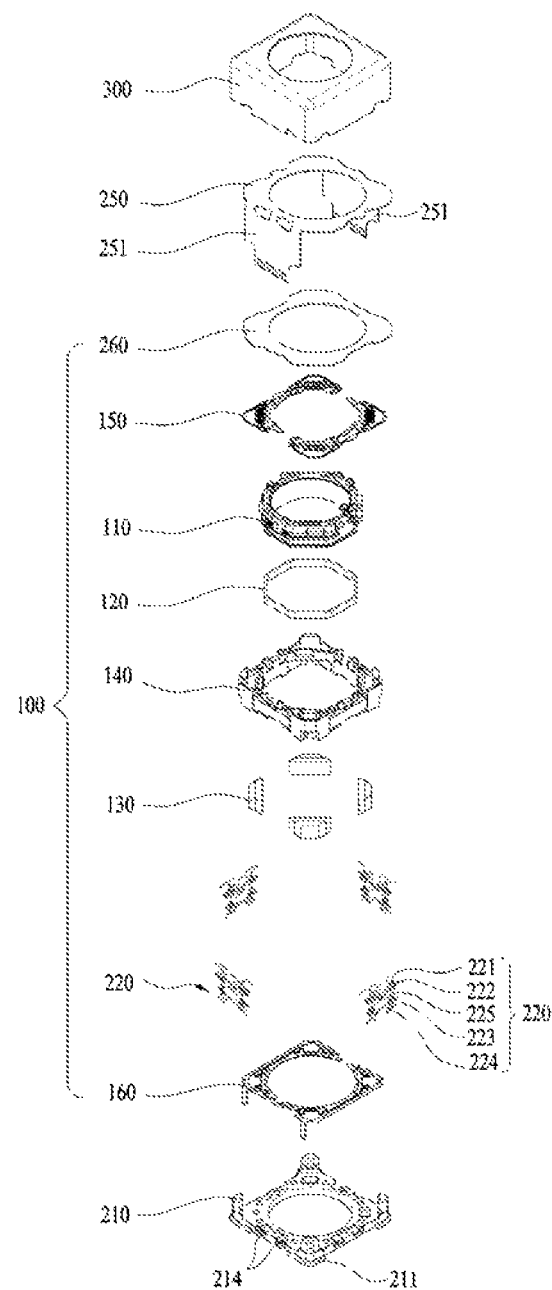
FIG. 2 is an exploded perspective view showing the lens moving apparatus according to the embodiment.
Figure 3:
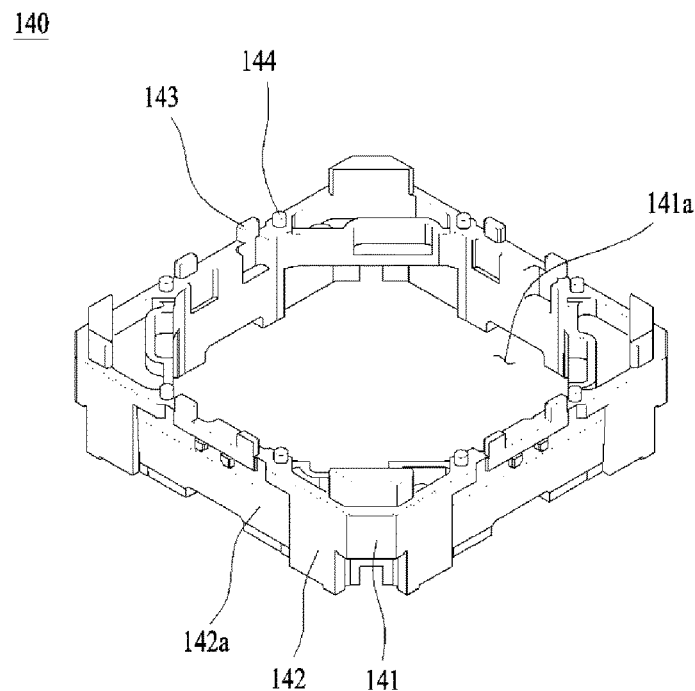
FIG. 3 is a perspective view showing a housing according to the embodiment.
Figure 4:
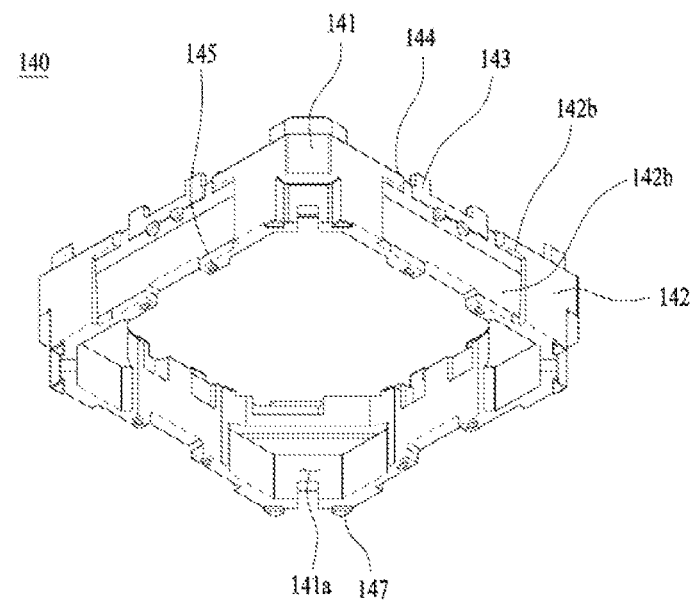
FIG. 4 is a rear perspective view showing the housing according to the embodiment.
Figure 5:
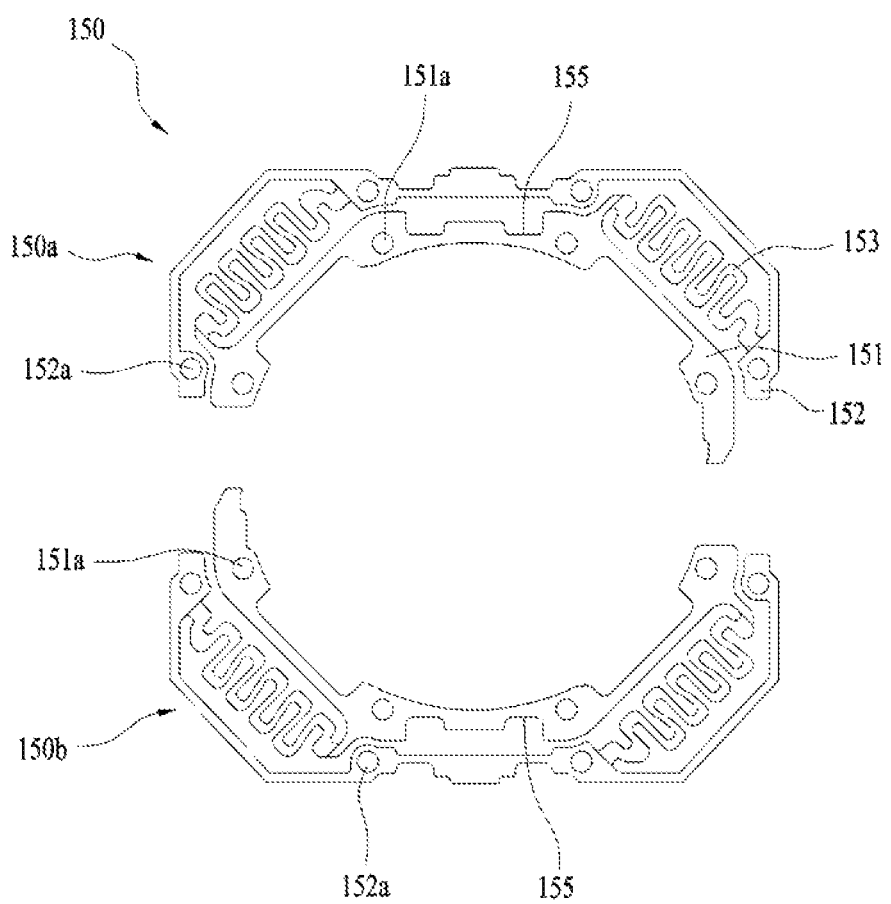
FIG. 5 is a plan view showing an upper elastic member 150 according to the embodiment.
Figure 6A:
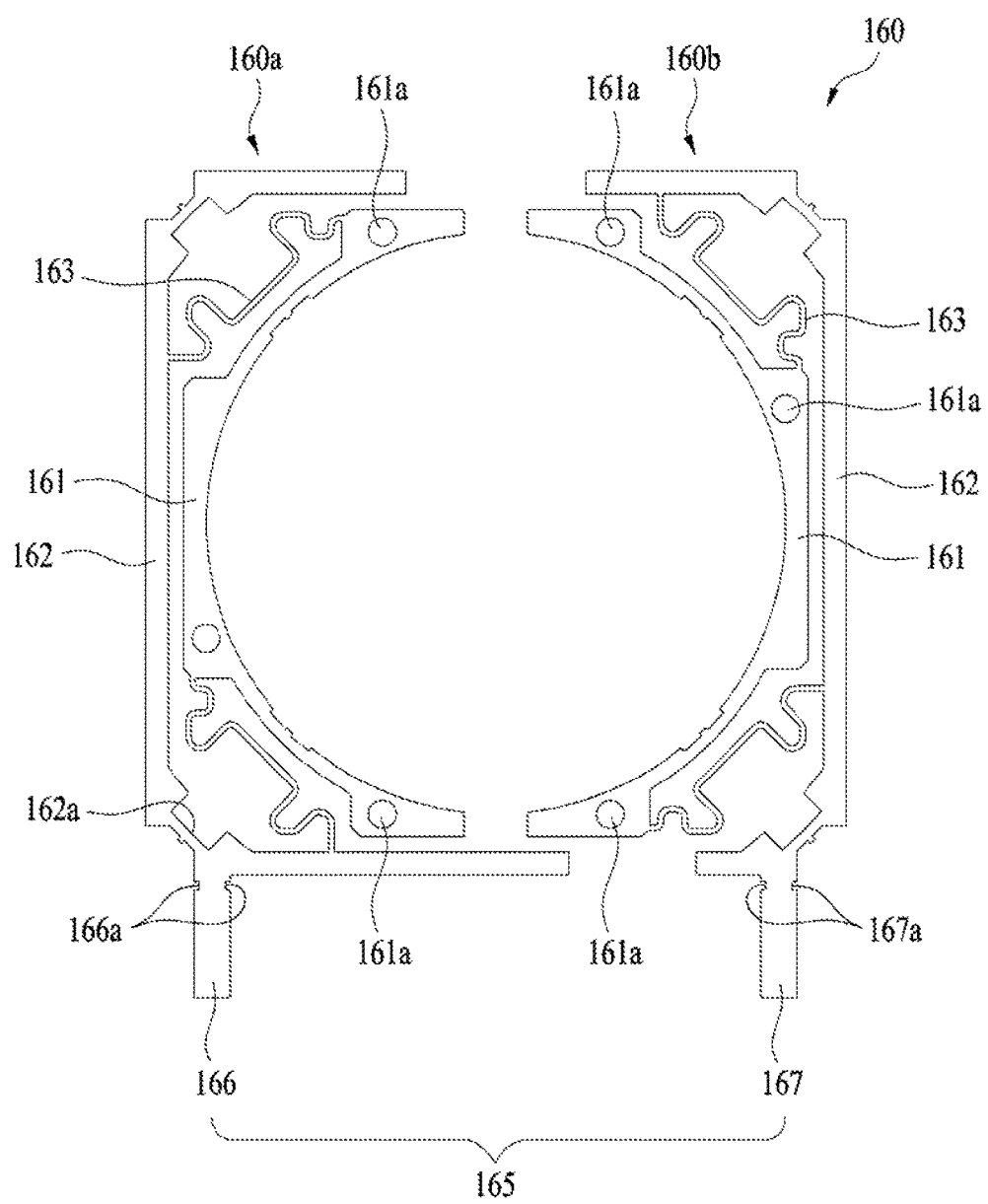
FIG. 6A is a plan view showing a lower elastic member according to the embodiment.
Figure 6B:
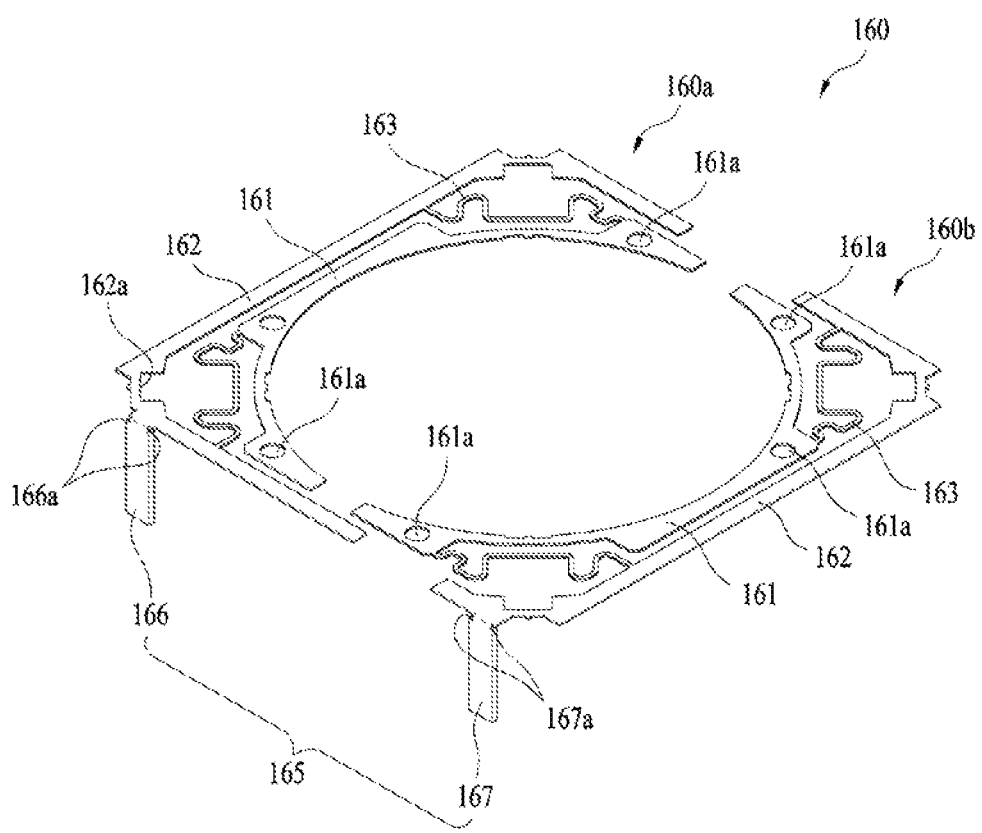
FIG. 6B is a perspective view showing a lower elastic member according to the embodiment.

FIG. 1 is a schematic perspective view showing a lens moving apparatus according to an embodiment. FIG. 2 is an exploded perspective view showing the lens moving apparatus according to the embodiment. FIG. 3 is a perspective view showing a housing 140 according to the embodiment. FIG. 4 is a rear perspective view showing the housing 14 according to the embodiment. FIG. 5 is a plan view showing an upper elastic member 150 according to the embodiment. FIG. 6A is a plan view showing a lower elastic member 160 according to the embodiment. FIG. 6B is a perspective view showing a lower elastic member according to the embodiment.

A handshake correction apparatus, which is applied to compact camera modules of mobile devices such as smart phones or tablet PCs, refers to an apparatus configured to prevent the contour of an image captured upon still image shooting from not being clearly formed due to vibration caused by the shaking of the user's hand. In addition, an autofocusing apparatus is configured to automatically focus the subject image on the surface of an image sensor. The handshake correction apparatus and the autofocusing apparatus may be configured in various manners. In this embodiment, the handshake correction and/or autofocusing operations may be performed in such a manner as to move an optical module, composed of a plurality of lenses, in a first direction or in a plane perpendicular to the first direction.

As shown in FIGS. 1 and 2, the lens moving apparatus according to the embodiment may include a movable unit 100. The movable unit 100 may fulfill the functions of autofocusing and handshake correction of a lens.

As shown in FIG. 2, the movable unit 100 may include a bobbin 110, a first coil 120, a first magnet 130, a housing 140, an upper elastic member 150, a lower elastic member 160 and a second coil 260.

The bobbin 110 may be provided on the outer surface thereof with the first coil 120 disposed in the first magnet 130, and thus the bobbin 110 may be installed in a space inside the housing 140 so as to be reciprocated in a first direction by the electromagnetic interaction between the first magnet 130 and the first coil 120.

The bobbin 110 may be elastically supported by upper and lower elastic members 150 and 160 such that the autofocusing function is fulfilled by the movement of the bobbin 110 in the first direction.

Although not shown in the drawing, the bobbin 110 may include a lens barrel (not shown) including at least one lens installed therein. The lens barrel may be installed in the bobbin 110 in various manners.

For example, the lens barrel may be coupled to the bobbin 110 in such a manner that a female threaded portion is formed on the inner surface of the bobbin 110 and a male threaded portion corresponding to the female threaded portion is formed on the outer surface of the lens barrel to engage therewith. However, the disclosure is not limited thereto, and the lens barrel may be directly installed in the bobbin 110 by ways other than the threaded engagement by formation of the threaded portion on the inner surface of the bobbin 110. Alternatively, at least one lens may also be integrally formed with the bobbin 110, without the lens barrel.

The lens coupled to the lens barrel may be composed of a single lens, or may be composed of two or more lenses constituting an optical system.

An autofocusing function may be controlled by the direction of electric current, and may be fulfilled by moving the bobbin 110 in the first direction.

For example, the bobbin 110 may move upward from its initial position upon the application of forward current whereas the bobbin 110 may move downward from its initial position upon the application of reverse current. In addition, the moving distance of the bobbin 110 from the initial position in one direction may be increased or decreased by controlling the amount of current flowing in the corresponding direction.

The bobbin 110 may be provided at upper and lower surfaces thereof with an upper support protrusion 113 (see FIG. 7) and a lower support protrusion (not shown). The upper support protrusion 113 may be configured to have a cylindrical shape or a polygonal column shape such that the inner frame 151 of the upper elastic member 150 is coupled to or released from the bobbin 110.

According to this embodiment, the inner frame 151 may have a first through hole 151a formed at a position corresponding to the upper support protrusion 113.

The upper support protrusion 113 may be inserted in the first through hole 151a by means of thermal fusion or an adhesive material such as epoxy. The upper support protrusion 113 may include a plurality of upper support protrusions. The distance between the respective upper support protrusions 113 may be suitably determined within the range within which interference with peripheral components can be avoided.

Specifically, the upper support protrusions 113 may be symmetrically arranged at a constant interval around the center of the bobbin 110, or may be arranged at irregular intervals so as to be symmetrical on the basis of a specific virtual line passing through the center of the bobbin 110.

The lower support protrusion may be configured to have a cylindrical shape or a polygonal column shape, similar to the upper support protrusion 113, such that the inner frame 161 of the lower elastic member 160 is coupled to or released from the bobbin 110.

According to the embodiment, the inner frame 161 may have a third through hole 161a formed at a position corresponding to the lower support protrusion. The lower support protrusion may be inserted in the third through hole 161a and may be secured thereto by means of thermal fusion or an adhesive material such as epoxy.

The distance between the respective lower support protrusions may be suitably determined within the range within which interference with peripheral components can be avoided. In other words, the lower support protrusions may be symmetrically arranged at a constant interval around the center of the bobbin 110.

The housing 140 may be configured into an approximate rectangular column shape for supporting the first magnet 130. According to this embodiment, the housing 140 may be configured into an octagonal column shape, as shown in FIGS. 3 and 4. The housing 140 may include a first surface 141 and a second surface 142. The first surface 141 may be intended to allow the first magnet 130 to be mounted thereon, and the second surface 142 may be intended to allow a support member 220 to be mounted thereon.

The first surface 141 may be formed at a corner region. According to this embodiment, the first surface 141 may be configured to have a surface area equal to or larger than the surface area corresponding to the first magnet 130. The first magnet 130 may be mounted at a first magnet mount portion 141a, which is formed on the inner surface of the first surface 141.

The first magnet mount portion 141a may be configured to have a size corresponding to the first magnet 130 and to face the first magnet 130 at three surfaces, that is, at both lateral side surfaces and the upper surface thereof.

Although the first magnet 130 may be attached to the first magnet mount portion 141a by means of an adhesive, the disclosure is not limited thereto, and an adhesive member such as a piece of double-sided tape may be used. Alternatively, in place of the recessed portion as shown in FIG. 4, the first magnet mount portion 141a may be configured as a mounting hole, in which the first magnet 130 is partially inserted or exposed.

The housing 140 may be provided on the upper surface thereof with a plurality of third stoppers 143 protruding upward. The third stoppers 143 may restrict the upward movement of the housing 140.

Furthermore, the third stoppers 143 also serve to guide the installation position of the upper elastic member 150. To this end, the upper elastic member 150 may have guide recesses 155, which are formed at positions corresponding to the third stoppers 143 and have a shape corresponding to that of the third stoppers 143, as shown in FIG. 5.

Although the first surface 141 may be formed to be parallel to the lateral surface of a cover member 300, this disclosure is not limited thereto. In addition, the first surface 141 may be configured to have a larger area than the second surface 142.

As shown in FIGS. 3 and 4, the second surface 142 may be provided with an escaping recess 142a having a predetermined depth. According to the embodiment, the escaping recess 142a may have an open lower surface. However, the disclosure is not limited thereto. The escaping recess 142a may have an open upper surface, or both the lower and upper surfaces thereof may be open.

With the provision of the escaping recess 142a, spatial interference between connecting members 153 and 163 and the bobbin 110 is avoided, and thus elastic deformation of the connecting members 153 and 163 may be more easily caused when the bobbin 110 moves in the first direction with respect to the housing 140. Furthermore, the lower portion of the escaping recess 142a may serve to prevent a coupling portion 224 of the lower part of the support member 220 from interfering with the housing 140. In addition, as shown in FIG. 4, an upper portion of the escaping recess 142a may be provided with a stepped portion 142b to support a portion of the upper part of the support member 220.

Although the escaping recess 142a may be positioned on the lateral surface of the housing 140, as in the embodiment, it may alternatively be positioned in a corner of the housing 140, depending on the shape and/or position of the support member 220.

The housing 140 may be provided on the upper surface thereof with a plurality of upper frame support protrusions 144, to which the outer frame 152 of the upper elastic member 150 is coupled. The upper frame support protrusions 144 may be more numerous than the upper support protrusions 113 because the outer frame 152 is longer than the inner frame 151.

The outer frame 152 may have second through holes 152a which are formed at positions corresponding to the upper frame support protrusions 144, and may have a shape corresponding to that of the upper support protrusions 144. The upper frame support protrusions 144 may be secured in the second through holes 152a by means of an adhesive or thermal fusion.

As shown in FIG. 4, the housing 140 may be provided on the lower surface thereof with a plurality of lower frame support protrusions 145, to which the outer frame 162 of the lower elastic member 160 is coupled. The lower frame support protrusions 145 may be more numerous than the lower support protrusions because the outer frame 162 of the lower elastic member 160 is longer than the inner frame 161.

The outer frame 162 may have fourth through holes 162a which are formed at positions corresponding to the lower frame support protrusions 145 and have a shape corresponding to that of the lower frame support protrusions 145. The lower frame support protrusions 145 may be secured in the fourth through holes 162a by means of an adhesive or thermal fusion.

The housing 140 may further be provided on the lower surface thereof with fourth stoppers 147. The fourth stoppers 147 may serve to restrict the distance that the housing 140 can move downward. Therefore, the fourth stoppers 147 may prevent the bottom surface of the housing 140 from colliding with a base 210.

The fourth stoppers 147 may be maintained in the state of being spaced a predetermined distance apart from the base 210 during an initial stage or during normal operation. By virtue of this construction, the housing 140 may be spaced apart not only from the base 210 disposed thereunder but also from the cover member 300 disposed thereover, and, as such, the housing 140 may be maintained at a constant level in the first direction without interference from upper and lower obstacles. Accordingly, the housing 140 may perform a shifting action in the second direction and/or the third direction, perpendicular to the first direction.

As shown in FIGS. 5, 6A and 6B, the upper elastic member 150 and the lower elastic member 160 may flexibly support the upward and/or downward movement of the bobbin 110 in the first direction. The upper elastic member 150 and the lower elastic member 160 may be constituted by a leaf spring.

The upper elastic member 150, which is disposed over the bobbin 110, is configured such that the inner frame 151 is coupled to the bobbin 110 and the outer frame 152 is coupled to the housing 140. The lower elastic member, which is disposed under the bobbin 110, is configured such that the inner frame 161 is coupled to the bobbin 110 and the outer frame 162 is coupled to the housing 140.

The upper elastic member 150 and the lower elastic member 160s may include the inner frames 151 and 161, coupled to the bobbin 110, the outer frames 152 and 162, coupled to the housing 140, and the connecting members 153 and 163, respectively connecting the inner frames 151 and 161 and the outer frames 152 and 162.

The connecting members 153 and 163 may be bent at least once to form a predetermined pattern. By virtue of positional change and fine deformation of the connecting members 153 and 163, the upward and/or downward movement of the bobbin 110 in the first direction may be flexibly (or elastically) supported.

According to the embodiment, the upper elastic member 150 has the plurality of second through holes 152a formed in the outer frame 152, and the plurality of first through holes 151a formed in the inner frame 151, as shown in FIG. 5.

The second through holes 152a may be fitted over the upper frame support protrusions 144 provided on the upper surface of the housing 140, and the first through holes 151a or recesses may be fitted over the upper support protrusions 113 provided on the upper surface of the bobbin 110. In other words, the outer frame 152 may be fixedly coupled to the housing 140 using the second holes 152a, and the inner frame 151 may be fixedly coupled to the bobbin 110 using the first through holes 151a or recesses.

The connecting member 153 may connect the inner frame 151 to the outer frame 152 such that the inner frame 151 is elastically deformable with respect to the outer frame 152 in the first direction within a predetermined range.

At least one of the inner frame 151 and the outer frame 152 of the upper elastic member 150 may be provided with at least one terminal member, which is conductively connected to at least one of the first coil 120 of the bobbin 110 and the printed circuit board 250.

As shown in FIG. 5, the upper elastic member 150 may include a first upper elastic member 150a and a second upper elastic member 150b, which are separated from each other.

Thanks to the dual partitioning structure, current having different polarities or different powers may be applied to the first upper elastic member 150a and the second upper elastic member 150b of the upper elastic member 150.

Specifically, the inner frame 151 and the outer frame 152 are coupled to the bobbin 110 and the housing 140, respectively, and then solder portions are provided at positions corresponding to opposite ends of the first coil 120 disposed at the bobbin 110. Subsequently, conductive connections such as solder are provided at the solder portions, whereby current having different polarities or different powers may be applied to the first upper elastic member 150a and the second upper elastic member 150b. In addition, the first upper elastic member 150a is conductively connected to one of opposite ends of the first coil 120, and the second upper elastic member 150b is conductively connected to the other of the opposite ends of the first coil 120, thus enabling external current to be applied thereto.

As shown in FIGS. 6A and 6B, the lower elastic member 160 may elastically connect the lower portion of the housing 140 to the lower portion of the bobbin 110. Specifically, the lower elastic member 160 may connect the lower portion of the housing 140 to the lower portion of the bobbin 110 such that the bobbin 110 can elastically reciprocate in the first direction with respect to the housing 140.

To this end, the lower elastic member 160 may include a plurality of fourth through holes or recesses 162a formed in the outer frame 162, and may additionally include a plurality of third through holes or recesses 161a.

The fourth through holes or recesses 162a may be engaged with the lower frame support protrusions 145 formed in the lower surface of the housing 140, and the third through holes or recesses 161a may be engaged with the lower support protrusions provided on the lower surface of the bobbin 110. In other words, the outer frames 162 may be coupled to the housing 140 by means of the fourth through holes or recesses 162a, and the inner frames 161 may be coupled to the bobbin 110 by means of the third through holes or recesses 161a.

The connecting members 163 connect the inner frames 161 to the outer frames 162 such that the inner frames 161 are elastically deformed within a predetermined range in the first direction with respect to the outer frames 162.

The lower elastic member 160 may be made of a conductive material. The lower elastic member 160 conductively connects the first coil 120 (i.e. both ends of the first coil 120) to the external power source. At this point, the first coil 120 may be configured such that one of the two ends of the first coil 120 is positioned under the bobbin 110 and the other of the two ends of the first coil 120 is positioned under the bobbin 110 by winding the coil an even number of times around the bobbin 110.

Also, in the case where the first coil 120 is of a block type rather than the above-mentioned winding type, the two ends of the first coil 120 are preferably positioned under the bobbin 110.

Thanks to the positioning of the two ends of the first coil 120 under the bobbin 110, the two ends of the first coil 120 may be conductively connected or soldered to the lower elastic members 120.

As shown in FIGS. 6A and 6B, the upper elastic member 160 may include a first lower elastic member 160a and a second lower elastic member 160b, which are conductively or spatially isolated from each other in the lateral direction.

Thanks to the dual-partitioning structure, the lower elastic member 160 may receive current having different polarities or different powers through the first and second lower elastic members 160a and 160b.

Specifically, after the inner frame 161 and the outer frame 162 are coupled to the bobbin 110 and the housing 140, respectively, soldering portions are provided at locations on the inner frame 161 corresponding to the both ends of the first coil 120 mounted on the bobbin 110. Subsequently, the soldering portions are provided with conductive connections such as solder, whereby current different polarities or different powers may be applied to the lower elastic member 160.

Furthermore, the first lower elastic member is conductively connected to one of both ends of the first coil 120 and the second lower elastic member is conductively connected to the other of both ends of the first coil 120, thus allowing external current to be applied thereto.

The first lower elastic member 160a and the second lower elastic member 160b, which are conductively isolated from each other, include second terminal portions 166 and 167, which are conductively connected to an external power source such that the external power is supplied to the two lines of the first coil 120.

The two second terminal portions 166 and 167 may be bent downward at the same side of the housing 140 such that the second terminal members 166 and 167 extend downward together with a terminal member 151 of the printed circuit board 250.

As shown in FIGS. 6A and 6B, the second terminal member 165 including the second terminal portions 166 and 167 may extend outward from one side of the outer frame 162, and may then be bent downward. Each of the two terminal portions 166 and 167 may have a rectangular plate shape.

According to this embodiment, the two second terminal portions 166 and 167 may be provided on the peripheral edge of one side of the outer frame 162. Therefore, the printed circuit board 250 may be provided with two cutouts 252 so as to prevent the second terminal portions 166 and 167 from interfering with the printed circuit board 250. Thanks to the cutouts 252, the first terminal members 251 of the printed circuit board 200 and the second terminal member 165 of the lower elastic member 160 may be mounted in the lens moving apparatus in the state of being conductively isolated from each other.

Each of the two second terminal portions 166 and 167 may include bending slits 166a and 167a formed in at least one of both lateral sides of the bent portion thereof. Thanks to the provision of the bending slits 166a and 117a, after the lower elastic member 160 is coupled to or disposed at the lower surfaces of the bobbin 110 and the housing 140, the second terminal portions 166 and 167 may be easily bent with respect to the outer frame 162, thus making it easy to manufacture the lens moving apparatus.

Alternatively, after the second terminal 165 is first bent, the lower elastic member 160 may be coupled to or disposed at the lower surfaces of the bobbin 110 and the housing 140.

One of the two ends of the first coil 120 may be conductively connected or soldered to a portion of the inner frame 161 of the first lower elastic member 160a, and the other of the two ends of the first coil 120 may be conductively connected or soldered to a portion of the inner frame 161 of the second lower elastic member 160b.

In another embodiment, the two terminal portions 166 and 167 may be provided at adjacent locations on one side of the outer frame 162. Accordingly, the printed circuit board 250 may be provided with a single cutout 252 so as to prevent the two second terminal portions 166 and 167 from interfering with the printed circuit board 250.

As described in the first embodiment, in order to prevent the two second terminal portions 166 and 167 from interfering with the printed circuit board 250, the two cutouts 252 may be respectively provided at two locations corresponding to the two second terminal portions 166 and 167.

The second coil 260 is disposed above the housing 140 such that it is spaced apart from the support member 220 by a predetermined distance, and serves to provide an electromagnetic force so as to move the support member 220 in the second and/or third directions. The second coil 260 may be disposed between the upper elastic member 150 and the printed circuit board 250.

The second coil 260 may be constituted by a base plate having a pattern coil, and may be layered on the printed circuit board 250 and coupled thereto. Alternatively, the second coil 260 may be configured to have a doughnut shape by winding a wire, and may be conductively connected to the printed circuit board 250. The second coil 260 generates electromagnetic force by using current received from the printed circuit board 250, and may move the support member 220 in the second and/or third directions to implement the handshake correction of the lens moving apparatus.

The printed circuit board 250 may be disposed over the second coil 260, and may be secured or coupled to the cover member 300. The printed circuit board 250 may be provided with the first terminal members 251, which is bent. As shown in FIG. 2, the printed circuit board 250 according to this embodiment may include the two first terminal members 251. Each of the first terminal members 251 may include a plurality of terminals so as to supply current received from the outside to the first coil 120 and the second coil 260. Unlike the construction shown in FIG. 2, only one first terminal member 251 may be provided at the printed circuit board 250, depending on the manner or structure whereby handshake correction and/or autofocusing operations are controlled.

The number of the terminals provided at each of the first terminal members 251 may increase or decrease depending on the kinds of the components to be controlled. The printed circuit board 250 may include only one first terminal member 251, which is bent.

As described above, each of the first terminal members 251 may be provided with the cutouts 252 so as to prevent the two second terminal portions 166 and 167 from interfering with the printed circuit board 250.

According to this embodiment, the connecting points between the lens moving apparatus and the external power source may be intensively arranged on one side of the lens moving apparatus, and thus the period of time required for the process of connecting the lens moving apparatus to the external power source may be considerably reduced. Therefore, the rate of production of the lens moving apparatus and electronic devices mounted on the lens moving apparatus may be improved.

The base 210 is disposed under the bobbin 110. As shown in FIG. 2, the base 210 may be configured to have an approximately rectangular shape, and may be provided on a flat surface thereof with the support member 220 held thereto. The base 210 may be provided with stepped portions 211 (see FIG. 7) to which adhesive is applied when the cover member 300 is adhesively attached thereto. The bottom surface of the stepped portion 211 may contact an end of the cover member 300.

The base 210 may have a support recess, which may be formed in the surface that faces the first terminal member 251 of the printed circuit board 250 and may have a size corresponding to that of the first terminal member 251. The support recess may be recessed from the outer surface of the base 210 to a predetermined depth such that the portion of the first terminal member 251 that protrudes from the base 210 is eliminated or controlled to a desired amount.

The stepped portions 211 may guide the cover member 300, which is mounted on the base 210. The cover member 300 may be mounted on the base 210 such that an end of the cover member 300 engages with the base 210 in a surface contact manner. The stepped portions 211 and the end of the cover member 300 may be adhesively attached to each other or sealed by means of, for example, an adhesive.

The base 210 may be provided at corners of the upper surface thereof with the support member mounting recess 214, in which the support member 220 is inserted. The support member mounting recess 214 may be provided with adhesive so as to securely hold the support member 220.

The end of the support member 220 may be inserted or disposed in the support member mounting recess 214, and may then be secured thereto by means of an adhesive or the like. The support member mounting recess 214 may include one or more support member mounting recesses formed in the flat surface at which the support member 220 is installed. The support member mounting recess 214 may have an approximately rectangular shape.

As shown in FIG. 2, according to the embodiment, the support member mounting recesses 214 may be provided in the base 210 in such a manner that two support member mounting recesses 214 are provided in each flat surface. The number of support member mounting recesses 214 may be increased or decreased in accordance with the shape of the support member 220, and three or more support member mounting recesses 214 may be provided in each flat surface.

The cover member 300 may be configured to have an approximate box shape capable of accommodating the movable unit 100, the printed circuit board 250 and the base 210. As shown in FIG. 1 etc., the cover member 300 may have escaping portions or recesses formed at positions corresponding to the stepped portions 211 of the base 210, and, as such, adhesive and the like may be injected through the escaping portions or recesses.

At this point, the adhesive is set to have a low viscosity such that the adhesive injected through the escaping portions or recesses can penetrate the contact areas between the stepped portions 211 and the end of the cover member 300. The adhesive applied to the escaping portions or recesses fills the gap between the mating surfaces of the cover member 300 and the base 210 through the escaping portions or recesses, thus enabling the cover member 300 to be sealingly coupled to the base 210.

Meanwhile, a camera module may be constructed in such a manner as to dispose an image sensor under the base 210 and to assemble the bobbin 110 with a lens barrel. Alternatively, an additional image sensor holder may be provided under the base 210. Furthermore, the base 210 may extend downward, and a camera module board including an image sensor mounted thereon may be directly coupled to the bottom surface of the base 210. The cameral module may be applied to mobile devices such as cellular phones.

Figure 7:
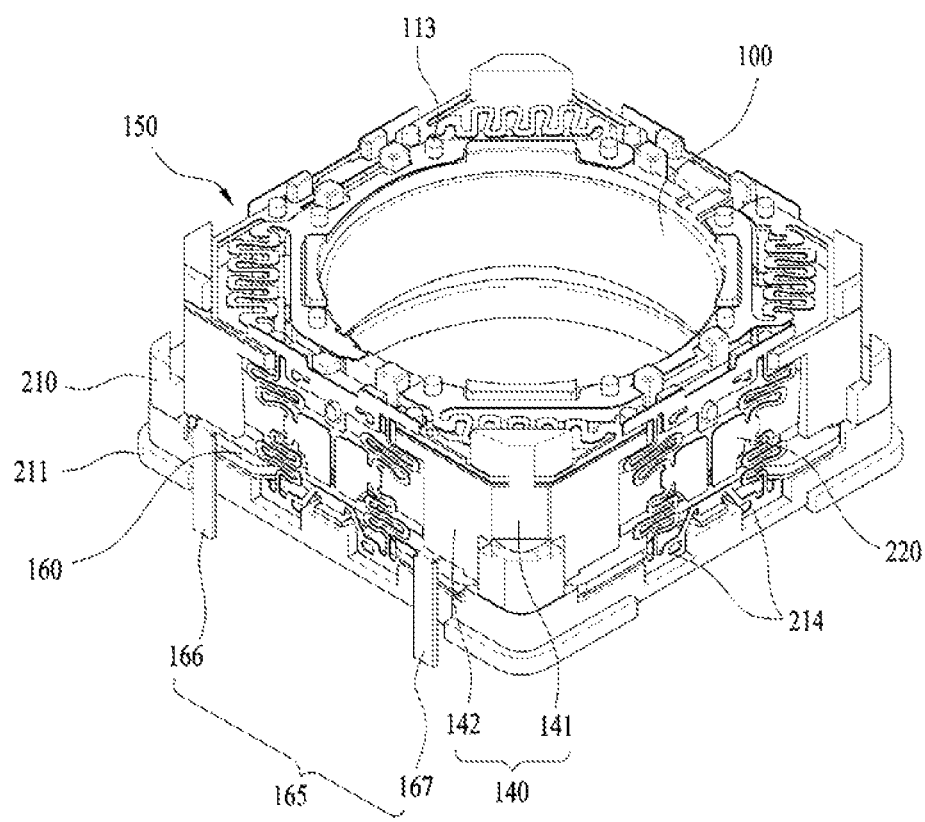
FIG. 7 is a perspective view showing the support members installed on the lens moving apparatus according to the embodiment.
Figure 8A:
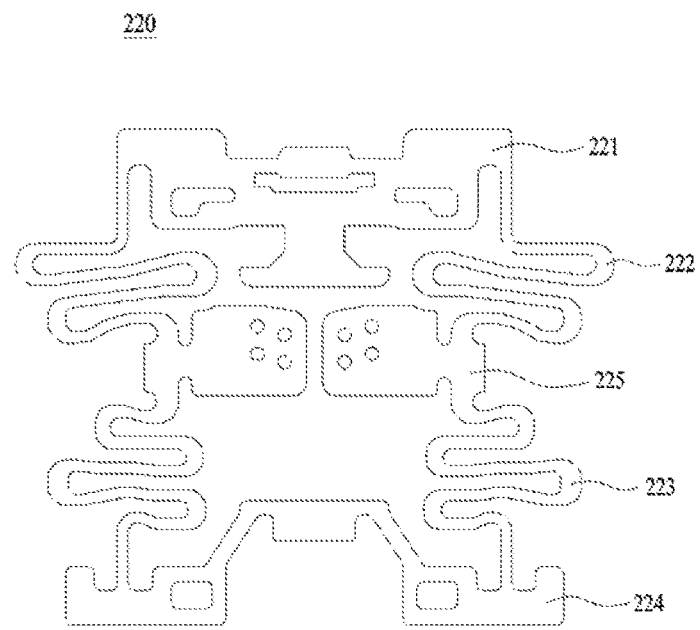
FIG. 8A is a front view showing the support member according to the embodiment.
Figure 8B:
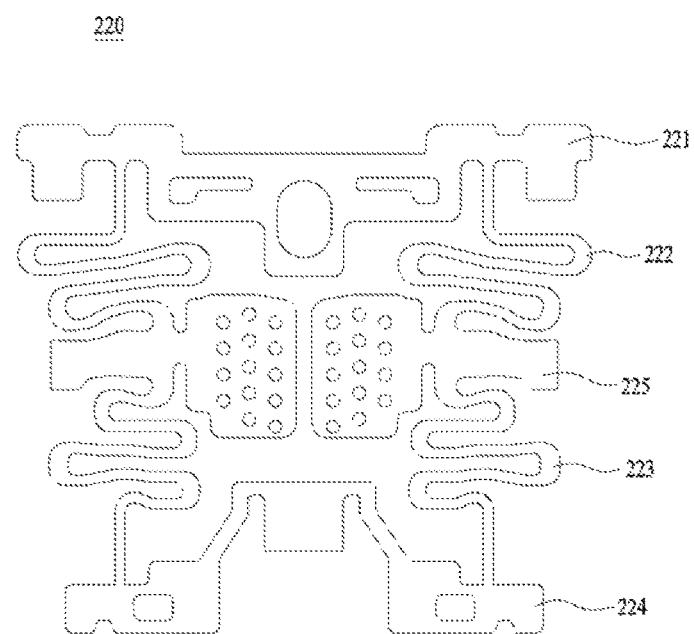
FIG. 8B is a front view showing a support member according to another embodiment.
Figure 8C:
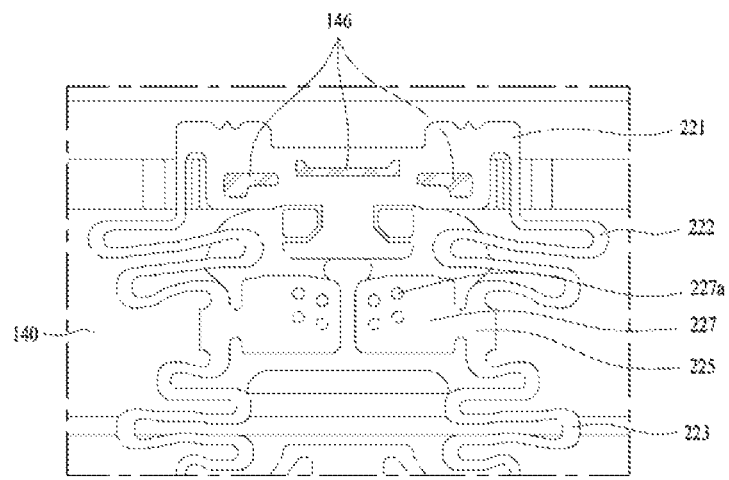
FIG. 8C is a front view showing the support member according to the first embodiment, which is mounted on the housing.
Figure 8D:
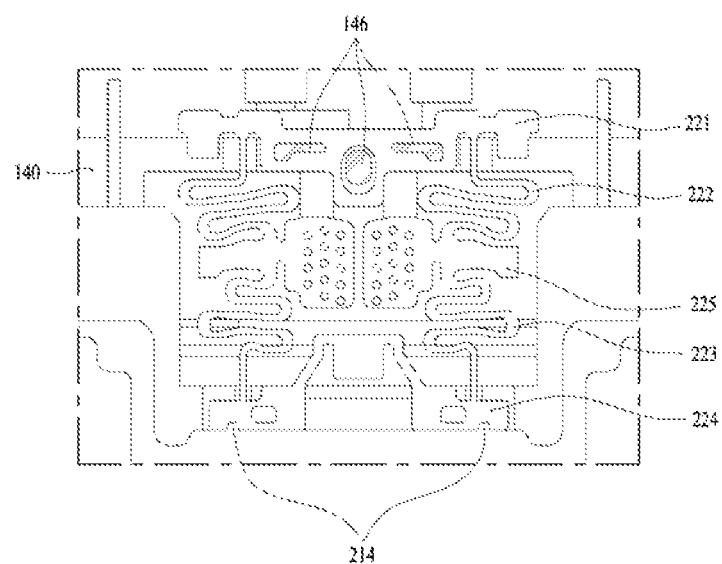
FIG. 8D is a front view showing the support member according to the another embodiment, which is mounted on the housing.

FIG. 7 is a perspective view showing the support members 220 installed on the lens moving apparatus according to the embodiment. FIG. 8A is a front view showing the support member 220 according to the embodiment. FIG. 8B is a front view showing a support member 220 according to another embodiment. FIG. 8C is a front view showing the support member 220 according to the first embodiment, which is mounted on the housing 140. FIG. 8D is a front view showing the support member 220 according to the another embodiment, which is mounted on the housing 140.

The support member 220 is disposed at one side surface of the housing 140. The support member 220 is coupled at an upper portion thereof to the housing 110 and is coupled at a lower portion thereof to the base 210. The support member 220 may support the bobbin 110 and the housing 140 such that the bobbin 110 and the housing 140 can be displaced in the second and third directions, which are perpendicular to the first direction. The support member 220 may be conductively connected to the first coil 120.

As shown in FIG. 7, the support members 220 may be separately disposed over the second surfaces 142 of the housing 140 and may be support the housing 140 in the state of being spaced apart from the base 210 by a predetermined distance. One end of the support member 220 may be inserted or disposed in the support member mounting recess 214, and may then be coupled thereto using an adhesive material such as epoxy. The other end of the support member 220 may be secured or coupled to holding portions 146 formed on the upper end of the side surface of the housing 140.

Since the support members 220 according to the embodiment are disposed over the second surfaces 142 of the housing 140, all four support members 220 may be symmetrically disposed. However, the disclosure is not limited thereto, and a total of eight support members 220 may be provided, two on each flat surface. The support member 220 may be conductively connected to the upper elastic member 150 or the flat surface of the upper elastic member 150.

Specifically, the support member 220 may include a first coupling portion 221, a second coupling portion 224, a first elastic deformation portion 222, a second elastic deformation portion 223 and a connecting portion 225.

The first coupling portion 221 is the portion of the support member 220 that is coupled to the upper end of the second surface 142 of the housing 140. The first coupling portion 221 may include through holes at locations corresponding to the holding portions 146 protruding from the second surface 142 of the housing 140 such that the coupling portion 221 is coupled to the upper end of the housing 140 by fitting the holding portions 146 into the through holes.

Since the support member 220 is constructed separately from the upper elastic member 150, the support member 220 and the upper elastic member 150 may be conductively connected to each other by means of conductive adhesive, solder, welding or the like. Accordingly, the upper elastic member 150 may apply current to the first coil 120 through the support member 220, which is conductively connected thereto.

The second coupling portion 224 may be the portion that is coupled to the base 210, and may be provided at the end of the support member 220. Although the second coupling portion 224 may be configured as a plate having a greater width than that of the first and second elastic deformation portions 222 and 223, the second coupling portion 224 may have a width equal to or smaller than the width of the first and second elastic deformation portions 222 and 223 without limitation.

According to the embodiment, the second coupling portion 224 may be divided into two elements, and may be inserted or disposed in the support member mounting recess 214, as shown in FIGS. 8A and 8B. The second coupling portion 224 may be fixedly coupled to the support member mounting recess 214 by means of an adhesive material such as epoxy.

However, the disclosure is not limited thereto, and the support member mounting recess 214 may be configured to correspond to the second coupling portion 224 and may be fitted in the second coupling portion 224. The second coupling portion 224 may include a single second coupling portion or two or more second coupling portions. The support member mounting recess 214 may be formed at the base 210 in a number corresponding to the number of second coupling portions 224.

The elastic deformation portions 222 and 223 may be bent at least once to form a predetermined pattern. According to the embodiment, the elastic deformation portions may include first and/or second elastic deformation portions 222, 223. The first elastic deformation portion 222 extends from the first coupling portion 221 and may be connected to the connecting portion 225. The second elastic deformation portions 223 may extend from the second coupling portion 224, and may be connected to the connecting portion 225.

The elastic deformation portions 222 and 223 may be configured with the connecting portion 225 disposed therebetween, and may be configured to have a symmetric shape. When the first elastic deformation portion 222 is configured as two or more bent portions in a zigzag manner, as shown in FIGS. 8A and 8B, the second elastic deformation portion 223 may also be correspondingly configured. However, the disclosure is not limited thereto, and the first elastic deformation portion 222 may be provided alone, or the second elastic deformation portion 223 may be configured so as to have some other structure.

The above configuration is merely an example, and the embodiment may be configured to have various patterns, such as a zigzag pattern. In this case, only one elastic deformation portion may be provided, without division into the first and second elastic deformation portions 222 and 223, and the elastic deformation portion may be configured to have a suspension wire shape, rather than the above pattern.

According to the embodiment, straight portions of the first and second elastic deformation portions 222 and 223 may be approximately parallel to a plane that is perpendicular to the first direction.

When the housing 140 moves in the second and/or third directions, which are perpendicular to the first direction, the elastic deformation portions 222 and 223 may be elastically and finely deformed in the moving direction of the housing 140 or in the longitudinal direction of the support member 220.

As a result, since the housing 140 may move in the second and third directions with almost no displacement in the first direction, the accuracy of handshake correction may be improved. This utilizes the property of the first and second elastic deformation portions 222 and 223, which are capable of extending in the longitudinal direction. The term "longitudinal direction" may refer to the direction of connection between first and second coupling portions 221 and 224.

The connecting portion 225 may include a pair of connecting portions, which connect the first elastic deformation portion 222 to the second elastic deformation portion 223 and are configured to have a symmetrical shape. Although the connecting portion 225 may be disposed between the first and second elastic deformation portions 222 and 223 as described above, the disclosure is not limited thereto. The connecting portion 225 may also be connected to one elastic deformation portion.

Although one support member 220 is provided with a pair of first and second elastic deformation portions 222 and 223 in the embodiment, the first and second coupling portions 221 and 224 may be integrally constructed, and the pair of first and second elastic deformation portions 222 and 223 may be concurrently coupled to the housing 140 and the base 210.

Alternatively, the support member 220 may be constituted by an elastic wire, which is coupled at one end thereof to the printed circuit board 250 and is coupled at the other end thereof to the base 210. In this case, the elastic wire may be positioned at the corner of the housing 140.

Figure 9:
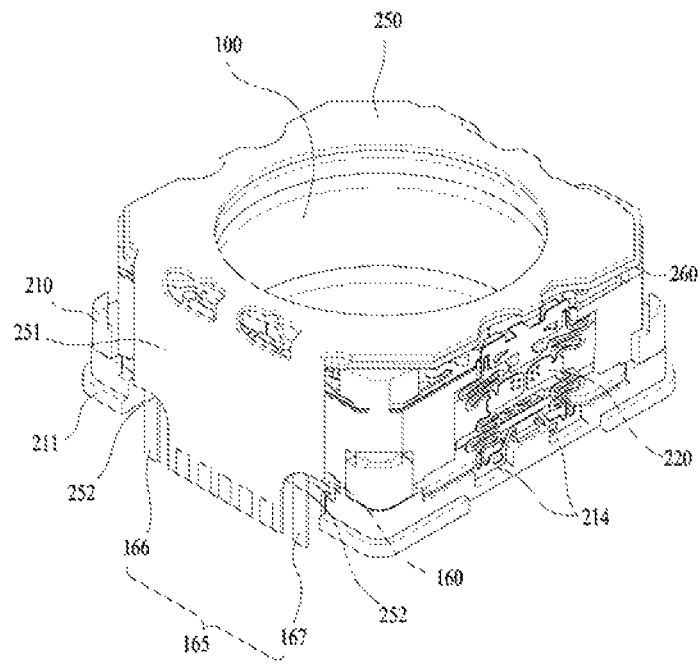
FIG. 9 is a perspective view showing the printed circuit board according to the first embodiment, which is mounted on the lens moving apparatus.

FIG. 9 is a perspective view showing the printed circuit board 250 according to the first embodiment, which is mounted on the lens moving apparatus. According to this embodiment, the printed circuit board 250 may be disposed over the housing 140, and the second coil 260 may be disposed between the housing 140 and the printed circuit board 250.

As described above, the first terminal member 251 of the printed circuit board 250, which is bent, may include the cutouts 252 so as to prevent the second terminal members 165, formed at the lower elastic member, from interfering with the printed circuit board 250.

When current is applied to the printed circuit board 250 through the first terminal member 251, the electromagnetic force generated by the second coil 260 may be directed in the second and/or third directions in accordance with Fleming's left-hand rule. Consequently, the support member 220 may be moved in the second and/or third directions by the electromagnetic force, thus implementing the handshake correction operation of the lens moving apparatus.

Figure 10A:
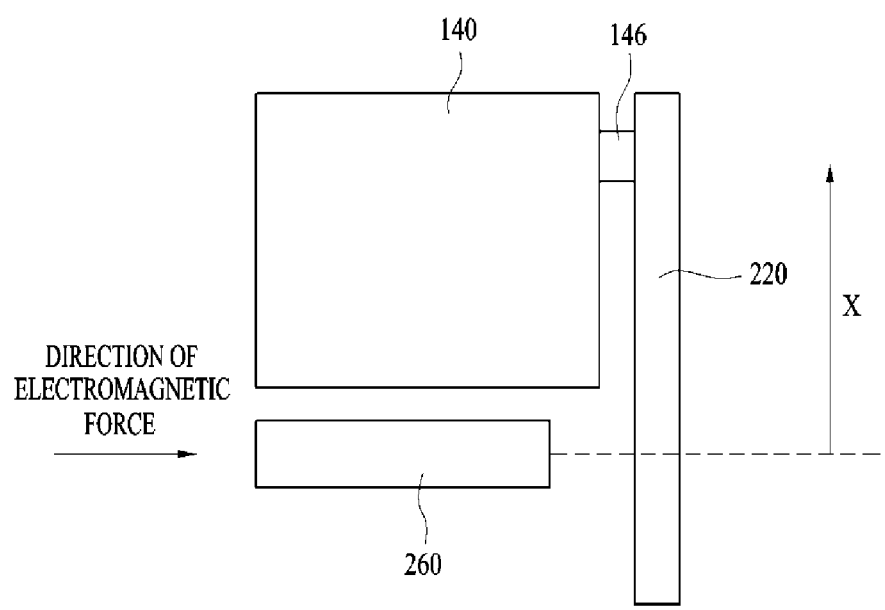
FIGS. 10A to 10C are views illustrating the operation of the lens moving apparatus in the case where the second coil is disposed under the housing.
Figure 10B:
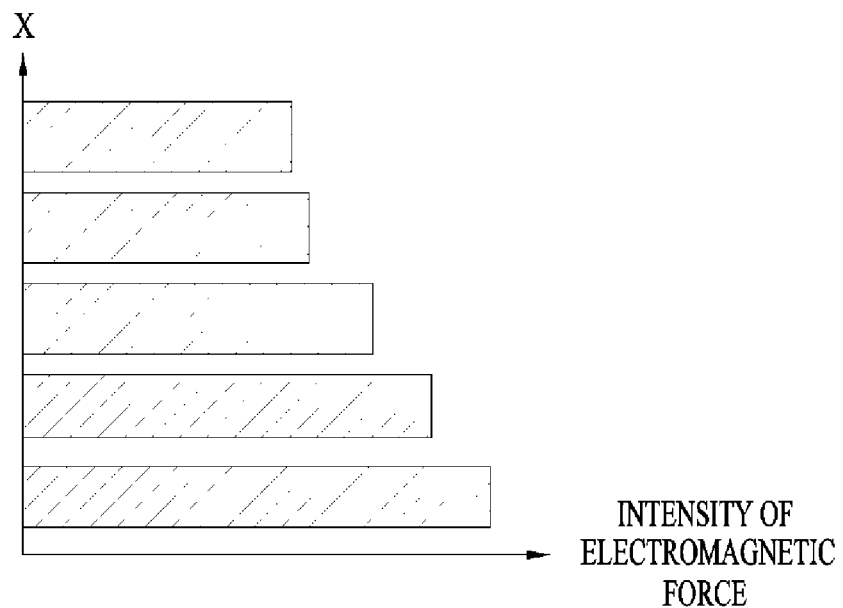
Figure 10C:
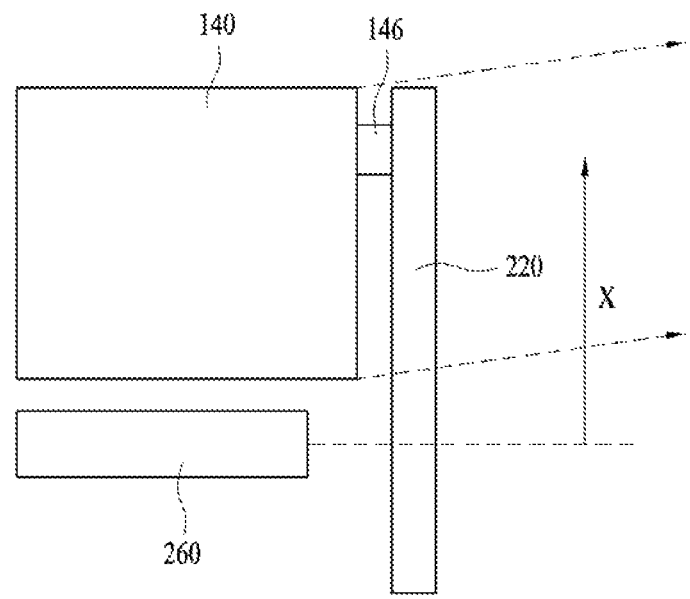

FIGS. 10A to 10C are views illustrating the operation of the lens moving apparatus in the case where the second coil 260 is disposed under the housing 140.

As described above, since the support member 220 is fitted in the support member mounting recess 214 in the base 210, the support member 220 is greatly restricted to movement in the second and/or third directions, and becomes able to move relatively freely in the second and/or third directions as it moves upward, thus enabling the implementation of handshake correction.

Accordingly, in order for the support member 220 to implement accurate handshake correction, the holding portions 146 of the housing 140, which are secured or coupled to the upper end of the support member 220, must have a relatively great displacement range in the second and/or third directions, and the support member 220 must have an increasingly reduced displacement range in the second and/or third directions as it moves downward.

When the second coil 260 is disposed under the housing 140, the intensity of the electromagnetic force generated by the second coil 260 is attenuated as the distance X, which is measured from the second coil 260 in the upward direction, increases, as illustrated in FIG. 10B. Accordingly, when the electromagnetic force is generated by the second coil 260, the displacement range in the second and/or third directions at the lower position of the support member 220, on which a relatively high electromagnetic force is exerted, is greater than the displacement range in the second and/or third directions at the upper position of the support member 220, on which a relatively low electromagnetic force is exerted.

As a result, when the support member 220 is displaced in the second and/or third directions for handshake correction due to the electromagnetic force generated by the second coil 260, the housing 140 may be displaced, and thus tilted in the direction of the dashed arrow of FIG. 10C.

Figure 11A:
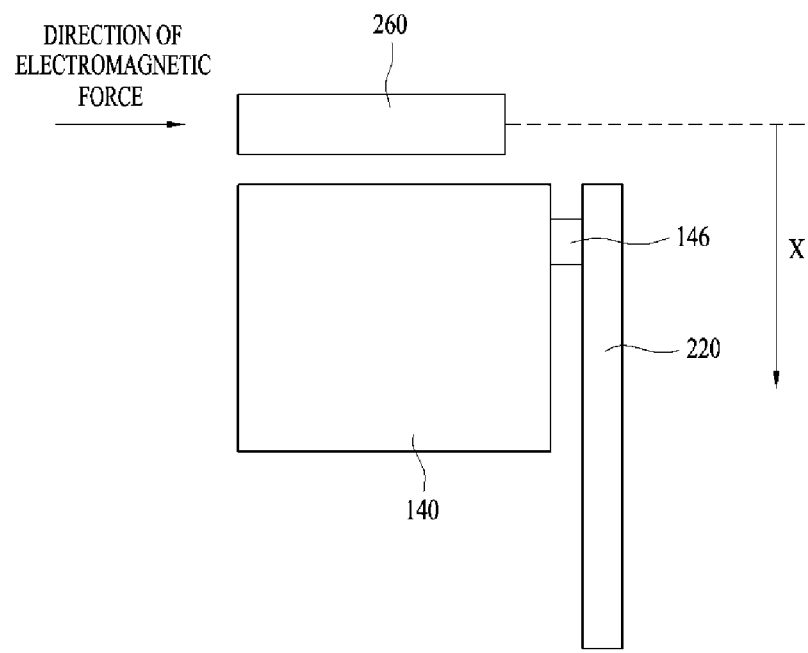
FIGS. 11A and 11B are views illustrating the operation of the lens moving apparatus in the case where the second coil is disposed over the housing.
Figure 11B:
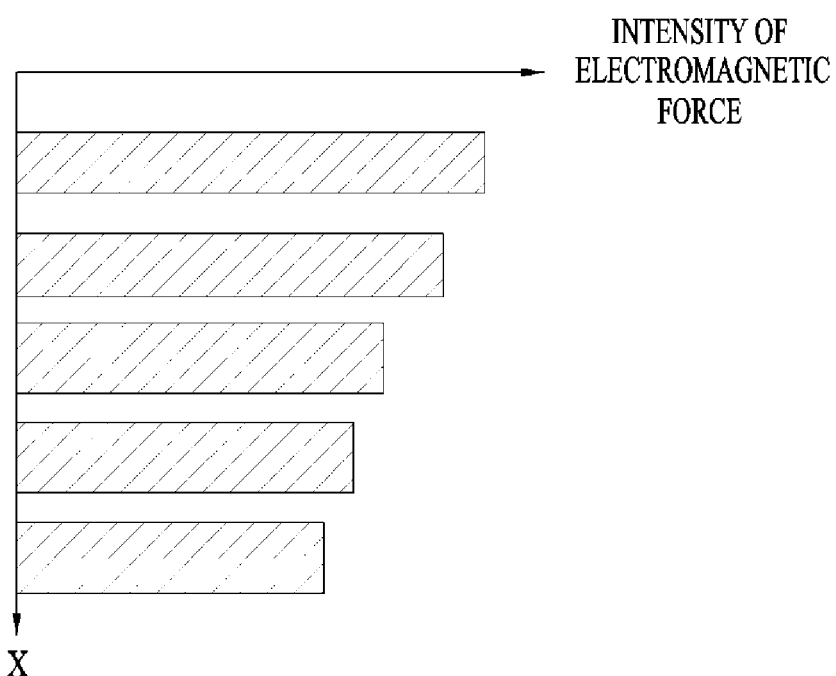

FIGS. 11A and 11B are views illustrating the operation of the lens moving apparatus in the case where the second coil 260 is disposed over the housing 140.

When the second coil 260 is disposed over the housing 140, the intensity of the electromagnetic force generated by the second coil 260 is attenuated as the distance X, which is measured from the second coil 260 in the downward direction, increases, as illustrated in FIG. 11B.

Accordingly, when the second coil 260 is disposed over the housing 140, the distance in the first direction between the second coil 260, which generates the electromagnetic force, and the holding portion 146 decreases, and a higher electromagnetic force is applied to the holding portion 146 from the second coil 260, compared to the case where the second coil 260 is disposed under the housing 140.

Consequently, when electromagnetic force is generated by the second coil 260, the displacement range in the second and/or third directions of the holding portion 146, which is positioned at the upper portion of the support member 220 and to which a higher electromagnetic force is applied, is larger than that of the lower portion of the support member 220, to which a lower electromagnetic force is applied.

According to this embodiment, since the second coil 260 is disposed over the housing 140, the displacement range in the second and/or third directions of the lower portion of the support member 220, which is secured to the base 210 and is thus greatly restricted in displacement in the second and/or third directions, decreases, and the displacement range in the second and/or third directions of the holding portion 146, which is relatively freely displacebale, increases. Therefore, the occurrence of tilting of the housing 140 is remarkably reduced, whereby the support member 220 is able to implement accurate handshake correction.

The lens moving apparatus according to the above embodiments may be applied to products in various fields, for example, camera modules. Such a camera module may be applied, for example, to mobile devices such as cellular phones.

The camera module according to the embodiment may include a lens barrel coupled to the bobbin 110, an image sensor (not shown), a PCB (not shown) and an optical system.

The lens barrel is as described above, and the PCB is the component on which the image sensor is mounted, and may constitute the bottom surface of the camera module.

The optical system may include at least one lens for transmitting an image to the image sensor. The optical system may be provided with an actuator module capable of fulfilling functions of autofocusing and handshake correction. The actuator module functioning to fulfill the function of autofocusing may be variously constructed, and a voice coil unit motor is primarily used in the actuator module. The lens moving apparatus according to the embodiments may serve as an actuator module fulfilling both functions of autofocusing and handshake correction.

The camera module may further include an infrared ray screening filter (not shown). The infrared ray screening filter functions to block the incidence of light in the infrared range on the image sensor. In the base 210, illustrated in FIG. 1, the infrared ray screening filter may be installed at a position corresponding to the image sensor, and may be coupled to a holder member (not shown). The base 210 may support the lower portion of the holder member.

The base 210 may be provided with an additional terminal member for conductive connection to the PCB, and the terminal may be integrally formed using a surface electrode. The base 210 may serve as a sensor holder for protecting the image sensor. In this case, although a projecting portion may be formed downward along the lateral side surface of the base 210, it is not an essential component. Although not shown in the drawings, an additional sensor holder may be disposed under the base 210 to serve as the projecting portion.

Although embodiments have been described with reference to a number of illustrative examples thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lens moving apparatus comprising:
    a housing for supporting a first magnet;
    a bobbin, which includes a first coil provided on an outer surface thereof and which moves in a first direction;
    a support member, which is disposed over one side surface of the housing, and which supports the bobbin and the housing such that the bobbin and the housing are movable in second and/or third directions, which are perpendicular to the first direction;
    a second coil, which is disposed over the housing and spaced apart from the support member by a predetermined distance and which generates an electromagnetic force to move the support member in the second and/or third directions;
    a printed circuit board disposed over the second coil; and
    a lower elastic member disposed under the bobbin;
    wherein the printed circuit board includes at least one first terminal member, which is provided on a side thereof and is bent,
    wherein the support member is disposed in parallel with the first direction and has a shape of a plate or a leaf,
    wherein the lower elastic member includes at least one second terminal member, which is bent at one side of the lower elastic member and conductively connected to an external power source such that an external power is supplied to the first coil,
    wherein a longitudinal direction of the second terminal member is disposed in parallel with the first direction, and
    wherein the first terminal member of the printed circuit board includes a cutout provided at a location corresponding to the second terminal member such that a second terminal portion of the second terminal member is inhibited from interfering with the printed circuit board.

2. The lens moving apparatus according to claim 1, further comprising:
    a base disposed under the bobbin to be spaced apart therefrom by a predetermined distance; and
    an upper elastic member, which is disposed over the bobbin and which includes an inner frame coupled to the bobbin and an outer frame coupled to the housing.

3. The lens moving apparatus according to claim 2, wherein the lower elastic member includes an inner frame coupled to the bobbin and an outer frame coupled to the housing.

4. The lens moving apparatus according to claim 3, wherein the lower elastic member is divided into a plurality of sub-lower elastic members, each of which includes the second terminal member.

5. The lens moving apparatus according to claim 4, wherein ends of the first coil are conductively connected to inner frames of the respective sub-lower elastic members.

6. The lens moving apparatus according to claim 4, wherein the second terminal members are bent at outer frames of the respective sub-lower elastic members.

7. The lens moving apparatus according to claim 4, wherein each of the second terminal members has a bending slit in at least one side of a bent portion thereof.

8. The lens moving apparatus according to claim 2, wherein the support member comprises:
    a first coupling portion coupled to the housing;
    a second coupling portion coupled to the base;
    a pair of first elastic deformation portions, which extend from the first coupling portion and are configured to be symmetric with respect to each other; and
    a pair of second elastic deformation portions, which extend from the second coupling portion and are configured to be symmetric with respect to each other.

9. The lens moving apparatus according to claim 8, wherein the support member further comprises:
    a pair of connecting portions, which connect the first elastic deformation portions to the second elastic deformation portions and which are configured to be symmetric with respect to each other.

10. The lens moving apparatus according to claim 8, wherein the base has a support member mounting recess to which the second coupling portion is coupled.

11. The lens moving apparatus according to claim 8, wherein the second coil is upwardly spaced apart by a predetermined distance from a holding portion, which is formed at the housing and which secures or couples the first coupling portion to the housing.

12. The lens moving apparatus according to claim 2, wherein the support member is coupled at one end thereof to the housing and is coupled at the other end thereof to the base.

13. The lens moving apparatus according to claim 12, wherein the support member is conductively connected to the first coil and the upper elastic member.

14. The lens moving apparatus according to claim 1, wherein the second coil is constituted by a plate having a pattern coil, and is layered on the printed circuit board and coupled thereto.

15. A camera module comprising an image sensor, a lens and a lens moving apparatus according to claim 1.

16. A mobile device comprising the camera module according to claim 15.

* * * * *